(12) United States Patent
Takahashi et al.

(10) Patent No.: US 9,037,420 B2
(45) Date of Patent: May 19, 2015

(54) INTERNAL RESIDUAL STRESS CALCULATING DEVICE, NON-TRANSITORY COMPUTER-READABLE MEDIUM, AND INTERNAL RESIDUAL STRESS CALCULATING METHOD

(75) Inventors: Ryosuke Takahashi, Kanagawa (JP); Tomoyuki Ito, Kanagawa (JP); Kiyoshi Hosoi, Kanagawa (JP); Takashi Ogino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 867 days.

(21) Appl. No.: 13/214,850

(22) Filed: Aug. 22, 2011

(65) Prior Publication Data

US 2012/0253702 A1    Oct. 4, 2012

(30) Foreign Application Priority Data

Mar. 29, 2011    (JP) ................. 2011-073411

(51) Int. Cl.
*G01L 1/00* (2006.01)
*G01L 5/00* (2006.01)

(52) U.S. Cl.
CPC .................... *G01L 5/0047* (2013.01)

(58) Field of Classification Search
CPC ....................................................... G01L 1/00
USPC ........................................................ 702/42
See application file for complete search history.

(56) References Cited

U.S. PATENT DOCUMENTS

| | | | |
|---|---|---|---|
| 5,933,167 A * | 8/1999 | Shimada et al. | 347/70 |
| 6,485,825 B1 * | 11/2002 | Heguri et al. | 428/343 |
| 7,363,179 B1 * | 4/2008 | Missell et al. | 702/81 |
| 7,401,477 B2 * | 7/2008 | Inoue et al. | 65/107 |
| 7,677,821 B2 * | 3/2010 | Kinoshita | 400/62 |
| 7,722,150 B2 * | 5/2010 | Furukawa et al. | 347/19 |
| 7,966,134 B2 * | 6/2011 | German | 702/41 |
| 8,073,640 B2 * | 12/2011 | Andle et al. | 702/54 |
| 8,201,921 B2 * | 6/2012 | Okada et al. | 347/42 |
| 8,404,411 B2 * | 3/2013 | Mitsumori et al. | 430/58.45 |

FOREIGN PATENT DOCUMENTS

| JP | A-2009-46230 | 3/2009 |
|---|---|---|
| JP | 2009-046230 | * 5/2009 |

* cited by examiner

*Primary Examiner* — Sujoy Kundu
*Assistant Examiner* — Alvaro Fortich
(74) *Attorney, Agent, or Firm* — Oliff PLC

(57) ABSTRACT

An internal residual stress calculating device includes a prediction unit that predicts a temporal variation in deformation which is received by a medium having an image formed thereon from a correcting device correcting a deformation, and a calculation unit that calculates an internal residual stress of the medium having passed through the correcting device on the basis of a relational expression including an elasticity term and a term related to a plastic deformation and the temporal variation in deformation predicted by the prediction unit.

8 Claims, 11 Drawing Sheets

FIG. 6

| TIME | DEFORMATION |
|------|-------------|
| $t_0$ | $d_0$ |
| $t_1$ | $d_1$ |
| $t_2$ | $d_2$ |
| ⋮ | ⋮ |
| $t_u$ | $d_u$ |

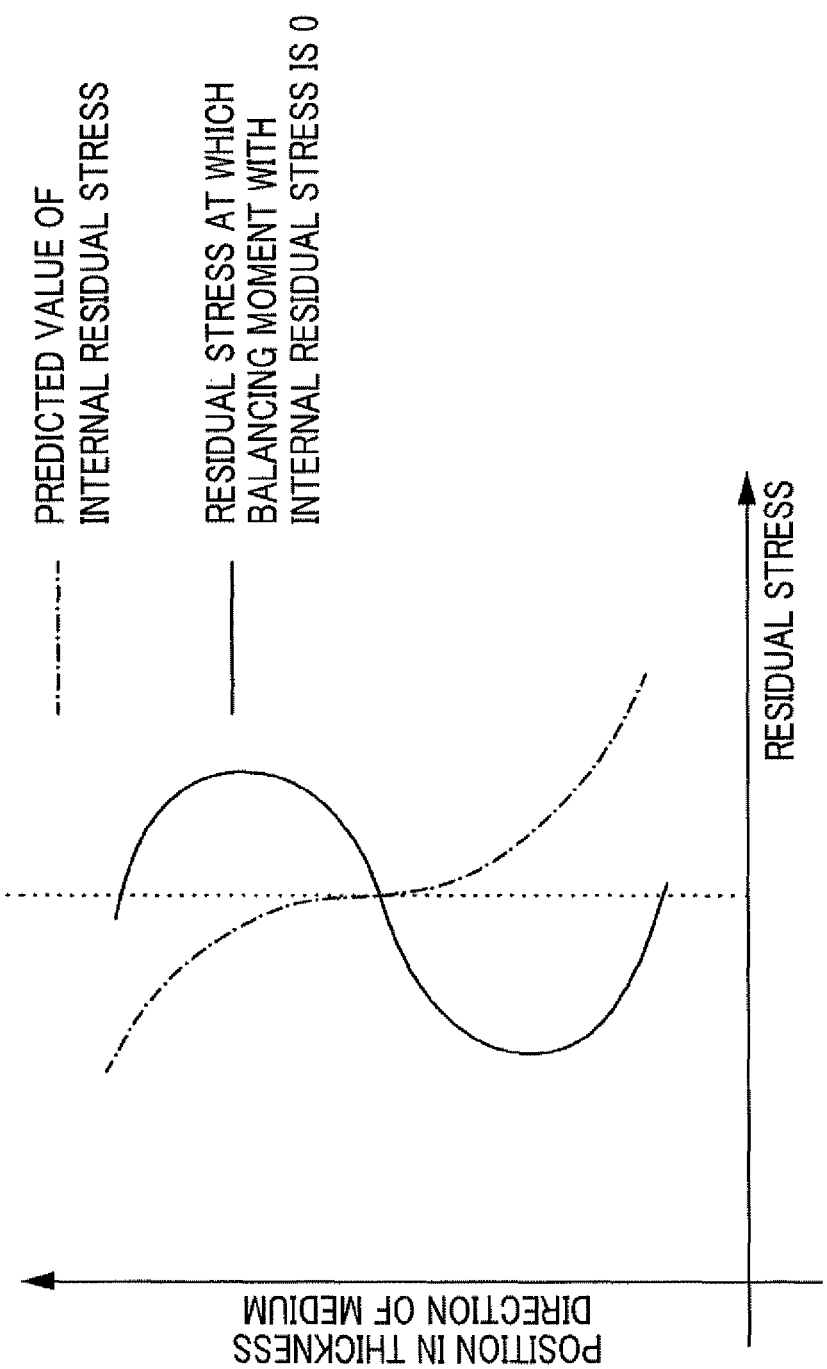

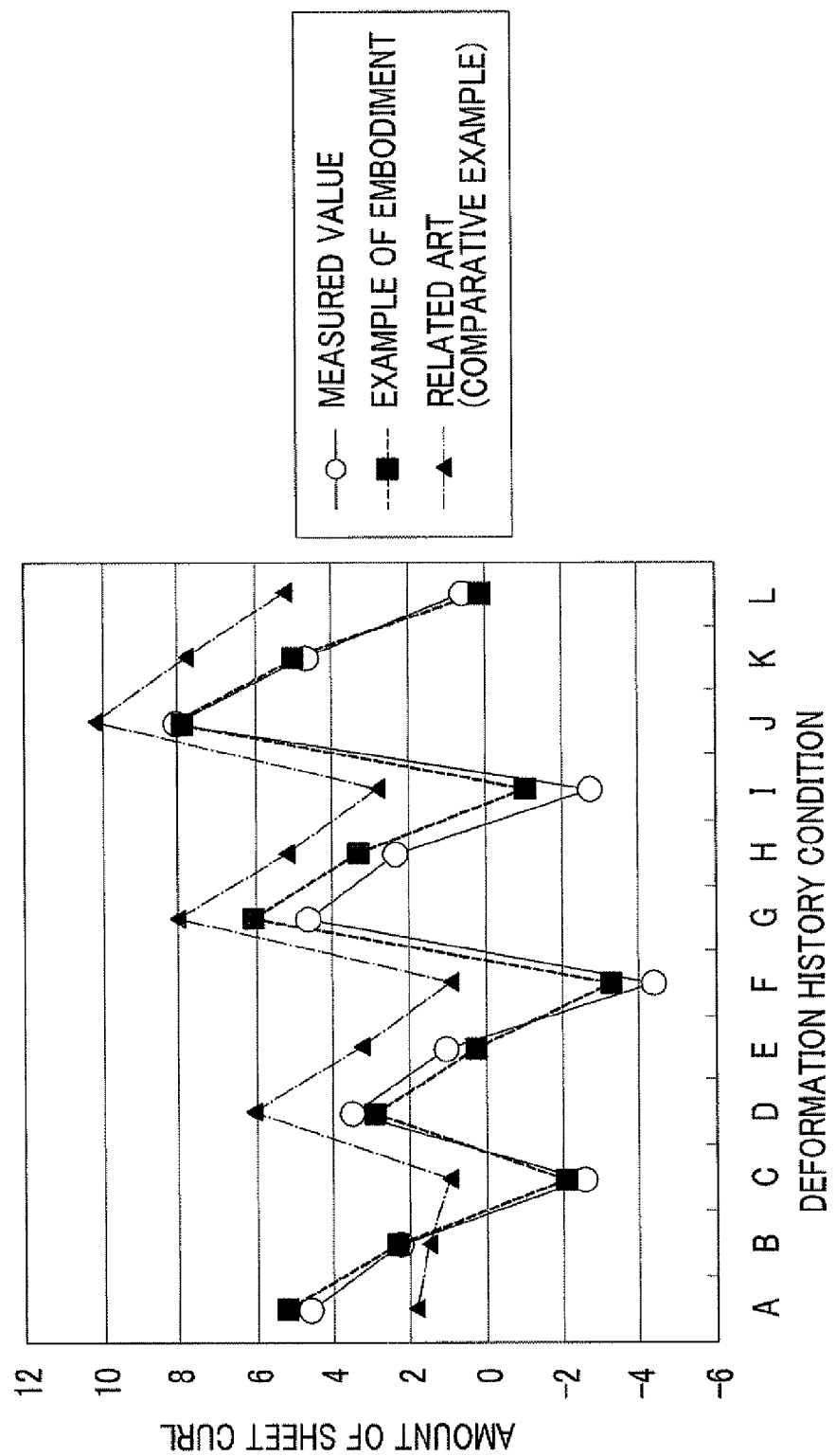

INTERNAL RESIDUAL STRESS CALCULATING DEVICE, NON-TRANSITORY COMPUTER-READABLE MEDIUM, AND INTERNAL RESIDUAL STRESS CALCULATING METHOD

CROSS-REFERENCE TO RELATED APPLICATIONS

This application is based on and claims priority under 35 USC 119 from Japanese Patent Application No. 2011-073411 filed Mar. 29, 2011.

BACKGROUND

Technical Field

The present invention relates to an internal residual stress calculating device, anon-transitory computer-readable medium storing a program thereof, and an internal residual stress calculating method.

SUMMARY

According to an aspect of the invention, there is provided an internal residual stress calculating device including a prediction unit that predicts a temporal variation in deformation which is received by a medium having an image formed thereon from a correcting device correcting a deformation, and a calculation unit that calculates an internal residual stress of the medium having passed through the correcting device on the basis of a relational expression including an elasticity term and a term related to a plastic deformation and the temporal variation in deformation predicted by the prediction unit.

BRIEF DESCRIPTION OF THE DRAWINGS

Exemplary embodiments of the present invention will be described in detail based on the following figures, wherein:

FIG. 6 is a diagram illustrating an example of a lookup table used by the internal residual stress calculating device according to the exemplary embodiment of the invention;

FIGS. 8A and 8B are diagrams illustrating an example a residual stress calculated by the internal residual stress calculating device according to the exemplary embodiment of the invention;

FIG. 10 is a diagram illustrating an operation example of the internal residual stress calculating device according to the exemplary embodiment of the invention.

DETAILED DESCRIPTION

Figure 1:
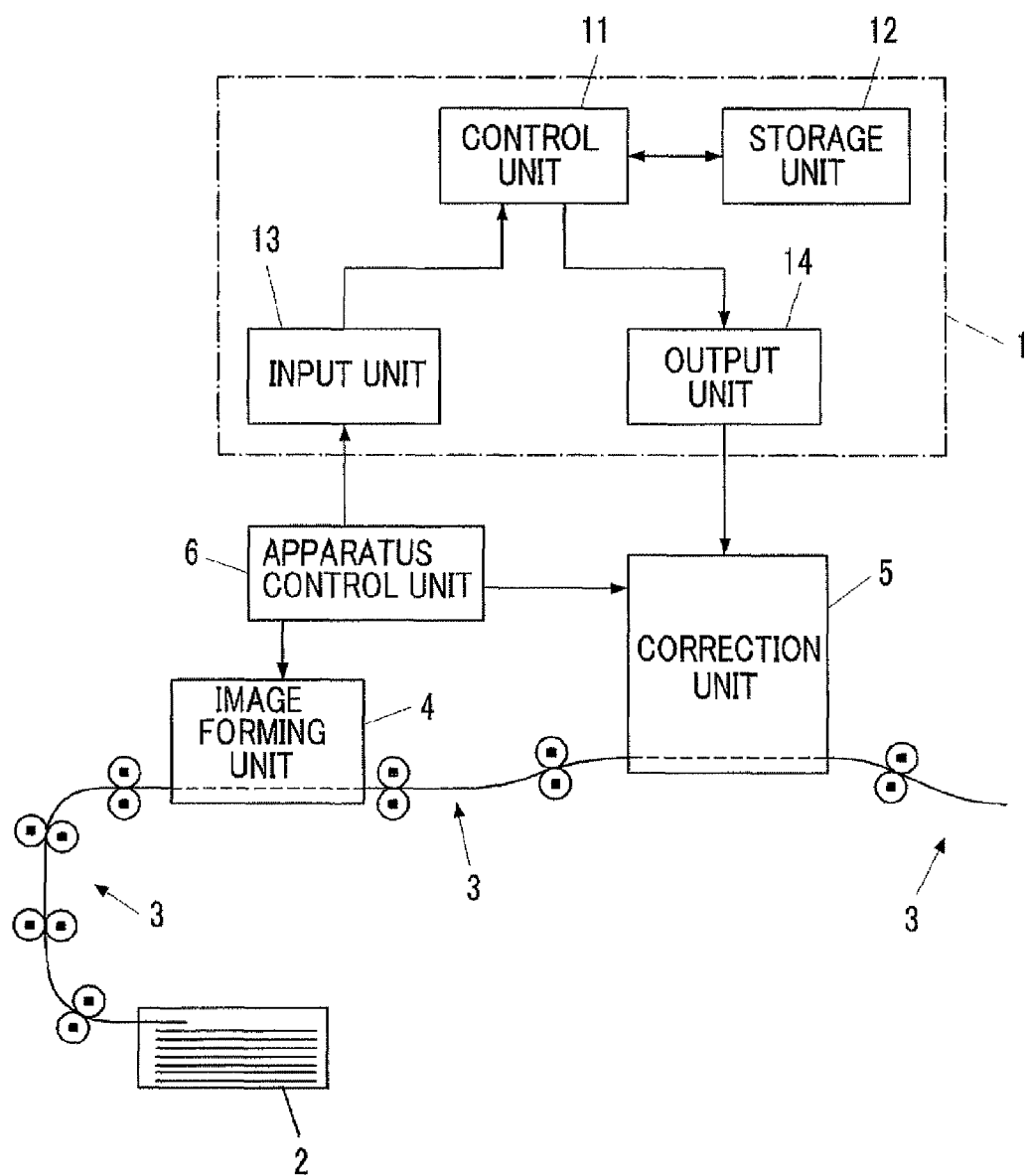
FIG. 1 is a block diagram illustrating the configuration of an image forming apparatus including an internal residual stress calculating device according to an exemplary embodiment of the invention.

An exemplary embodiment of the invention will be described with reference to the accompanying drawings. An internal residual stress calculating device 1 according to this exemplary embodiment is used, for example, in an image forming apparatus having a so-called decurler (a correcting device correcting a deformation of a medium). As shown in FIG. 1, the image forming apparatus having the internal residual stress calculating device 1 according to this exemplary embodiment includes a medium supplying unit 2 that stores media (for example, sheet-like media such as sheets of paper) on which an image should be formed, a transport unit 3 that carries a medium from the medium supplying unit 2, an image forming unit 4 that forms an image on the medium transported by the transport unit 3 on the basis of image information input from the outside, a correction unit 5 that is disposed in the transport unit 3 and that corrects a deformation of the medium having an image formed thereon which is transported by the transport unit 3, and an apparatus control unit 6 that controls all of the units, in addition to the internal residual stress calculating device 1.

Here, the apparatus control unit 6 receives an image formation instruction from the outside of the image forming apparatus and controls the transport unit 3 to transport a medium stored in the medium supplying unit 2 to the image forming unit 4. The apparatus control unit 6 controls the image forming unit 4 to form an image corresponding to the instruction on the medium. The correction unit 5 corrects the deformation of the medium having an image formed thereon. The apparatus control unit 6 outputs information for specifying the rigidity of a medium as an image forming destination stored in the medium supplying unit 2. This information may be given in advance by a user and the like.

The internal residual stress calculating device 1 according to this exemplary embodiment includes a control unit 11, a storage unit 12, an input unit 13, and an output unit 14.

The control unit 11 includes a program control device such as a central processing unit (CPU). The control unit 11 works in accordance with a program stored in the storage unit 12. Specifically, the control unit 11 predicts a temporal variation in deformation which is received by the medium having an image formed thereon from the correction unit 5 as a correcting device correcting a deformation. The control unit 11 performs a process of calculating a predicted value of an internal residual stress of the medium having passed through the correction unit 5 on the basis of a relational expression including an elasticity term and a term related to a plastic deformation and the predicted temporal variation in deformation. The details of the process performed by the control unit 11 will be described in detail later.

The storage unit 12 is a memory device or the like and stores a program performed by the control unit 11. The program may be provided in a state where it is stored on a computer-readable recording medium such as a DVD-ROM (Digital Versatile Disc Read Only Memory) and may be copied to the storage unit 12. The storage unit 12 also serves as a work memory of the control unit 11.

The input unit 13 receives information representing the type of a medium used to form an image from the apparatus control unit 6 and outputs the received information to the control unit 11. The output unit 14 outputs information or instructions input from the control unit 11 to the correction unit 5.

Figure 2:
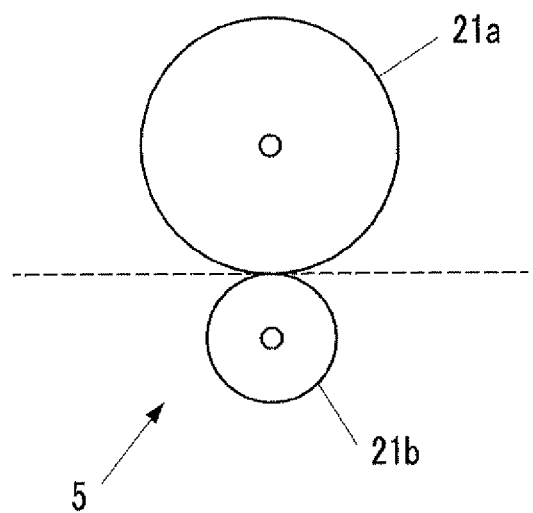
FIG. 2 is a diagram illustrating an example of a correcting device.

Specifically, as shown in FIG. 2, the correction unit 5 includes at least a pair of rollers 21*a* and 21*b* pressing each other. The correction unit 5 forcibly deforms the medium by applying a pressing force to the medium between the rollers 21*a* and 21*b*. The correction unit 5 can change the pressing force, for example, by changing an inter-shaft distance between the rollers 21*a* and 21*b*. The correction unit 5 as a decurler is widely known and thus will not be repeatedly described in detail.

Figure 3:
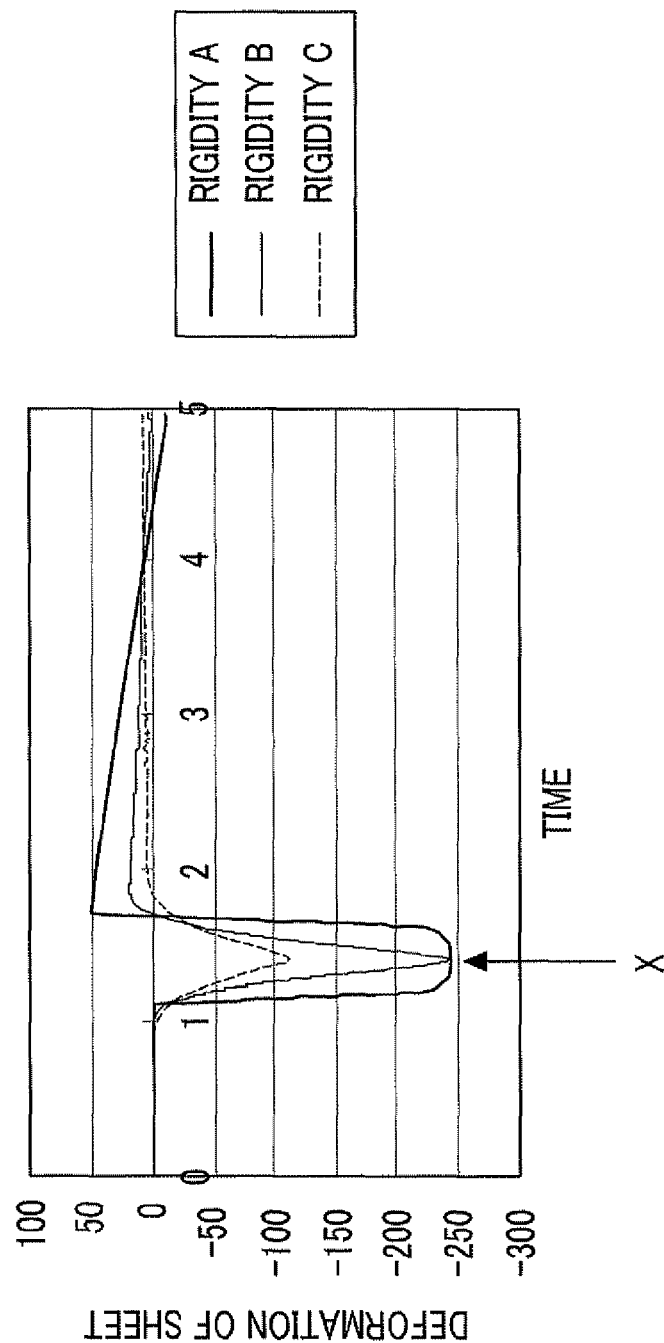
FIG. 3 is a diagram illustrating an example of a deformation history in the correcting device.

Since the correction unit 5 has the above-mentioned configuration, a deformation shown in FIG. 3 is temporally applied to the medium passing through the correction unit 5 in the thickness direction of the medium. In FIG. 3, the horizontal axis represents the elapsed time and the vertical axis represents the deformation of a sheet of paper (the deformation in the thickness direction of the medium in the initial state). In FIG. 3, plural graphs are drawn to correspond to the stiffnesses of media, where a medium is greatly deformed by the rollers 21*a* and 21*b* at the time of passing through time t1 (X), the deformation occurs on one surface of the medium just after the medium is discharged from the rollers 21*a* and 21*b* (at time t2), and the deformation varies to the other surface as time elapses. In another example, the correction unit 5 may include three pairs of rollers and a medium is sequentially deformed three times (X, Y, and Z) by the pairs of rollers as shown in FIG. 4.

Figure 5:
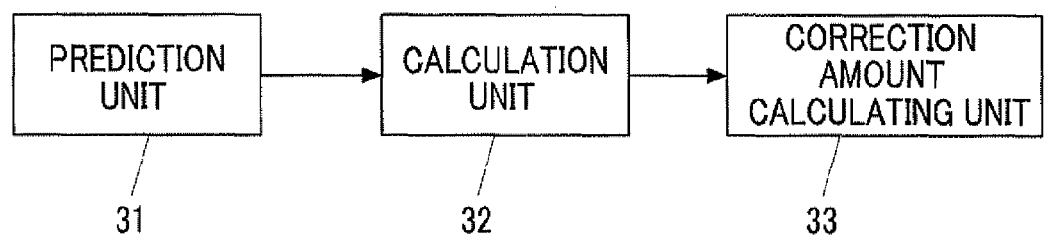
FIG. 5 is a functional block diagram illustrating the configuration of the internal residual stress calculating device according to the exemplary embodiment of the invention.

A process of predicting a deformation caused in a medium, which is performed by the control unit 11 of the internal residual stress calculating device 1, will be described below. The control unit 11 functionally includes a prediction unit 31, a calculation unit 32, and a correction amount calculating unit 33, as shown in FIG. 5.

Figure 6:
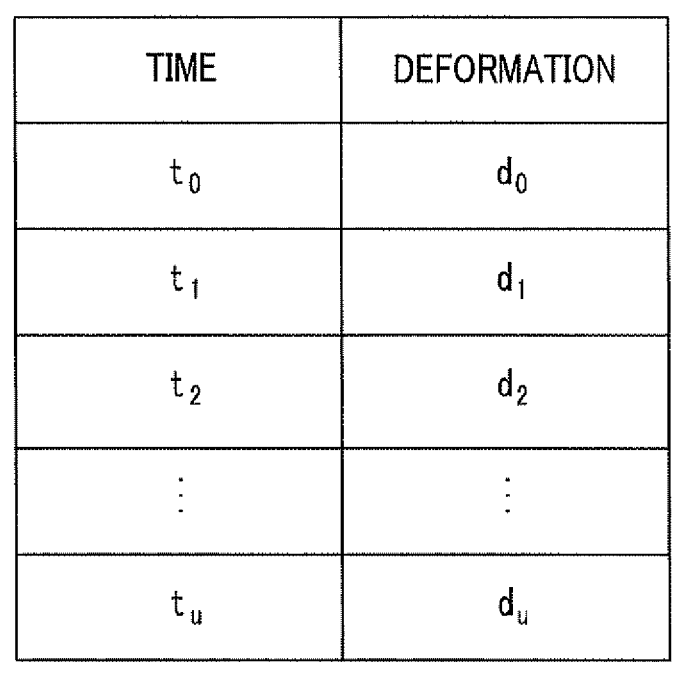

The prediction unit 31 predicts a temporal variation (curvature history) of the deformation received by the medium from the correction unit 5 depending on the stiffness of the medium. This prediction is performed by calculating a numerical expression corresponding to the graphs shown in FIGS. 3 and 4 or data listing coordinates (time, deformation) of points in the graphs at plural times. In an example of this exemplary embodiment, deformation values d0, d1, ..., dn at times t0, t1, t2, ..., tn (where t0=0, ti−1<ti, ti+1−ti=dt, tn=T) obtained by dividing a period of time from a certain time t=0 before the correction in the correction unit 5 to a time t=T after the correction by a predetermined interval dt are stored as a table (lookup table, which is hereinafter referred to as LUT) in the storage unit 12 as shown in FIG. 6. The LUT may be created for the stiffness of the medium and may be stored in the storage unit 12. In this case, a table corresponding to the stiffness of the medium specified by the information output from the apparatus control unit 6 is read out.

Figure 4:
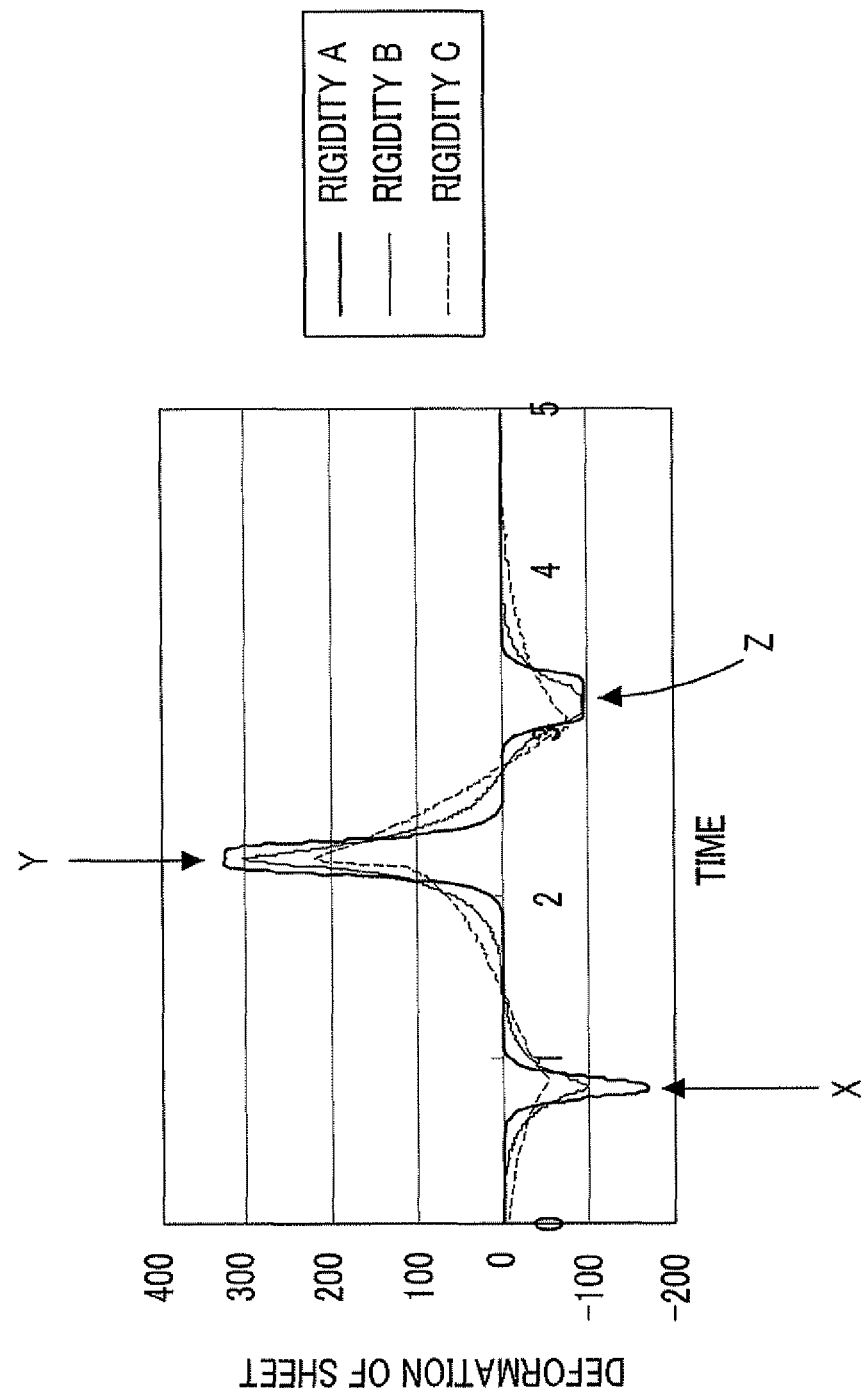
FIG. 4 is a diagram illustrating another example of the deformation history in the correcting device.

In another example of this exemplary embodiment, an approximation formula or a theoretical formula corresponding to the graphs shown in FIGS. 3 and 4 are determined in advance and the prediction unit 31 calculates the deformation values d0, d1, ..., dn at times t0, t1, t2, ..., tn (where t0=0, ti−1<ti, ti+1−ti=dt, tn=T) obtained by dividing a period of time from a certain time t=0 before the correction in the correction unit 5 to a time t=T after the correction by a predetermined interval dt on the basis of the approximation formula or the theoretical formula.

In this case, a parameter corresponding to the stiffness of the medium may be included in the approximation formula or the like and a value corresponding to the stiffness of the medium specified by the information output from the apparatus control unit 6 may be calculated. Alternatively, different approximation formulas for the stiffnesses of the media may be determined and the values may be calculated using the approximation formulas corresponding to the stiffness specified by the information output from the apparatus control unit 6. Here, an approximation formula or a theoretical formula can be created, for example, using a structural analysis technique.

In another example, the prediction unit 31 may determine whether an LUT corresponding to the stiffness of a medium specified by the information output from the apparatus control unit 6 is stored in the storage unit 12, may acquire the deformation values d0, d1, ..., dn at times t0, t1, t2, ..., tn (where t0=0, ti−1<ti, ti+1−ti=dt, tn=T) obtained by dividing a period of time from a certain time t=0 before the correction in the correction unit 5 to a time t=T after the correction by a predetermined interval dt with reference to the LUT when it is determined that the LUT is stored, and may calculate the deformation values d0, d1, ..., dn at times t0, t1, t2, ..., tn (where t0=0, ti−1<ti, tn=T) using the approximation formula created by the structural analysis technique when it is determined that the LUT is not stored.

The calculation unit 32 calculates an internal residual stress of the medium passing through the correction unit 5 using the calculation result of the prediction unit 31. Specifically, the calculation unit 32 calculates a temporal variation in distortion $\epsilon$ at the points inside the medium from the curvature history information acquired by the prediction unit 31.

Figure 7:
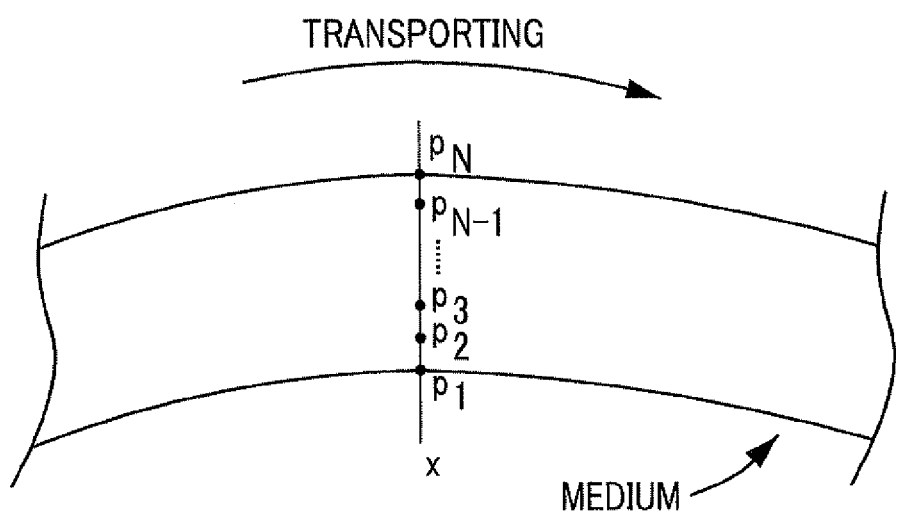
FIG. 7 is a diagram illustrating an example where points inside a medium are set by the internal residual stress calculating device according to the exemplary embodiment of the invention.

Specifically, as shown in FIG. 7, the calculation unit 32 takes N points p1, p2, ..., pN in the thickness direction in a virtual cutting plane at a predetermined position X (the center in the medium transporting direction or the like) in the medium transporting direction and acquires the temporal variation ($\epsilon i(t)$, where i=1, 2, ..., N) of the distortion 6 at the points. Here, the temporal variation of the distortion $\epsilon$ at the points with an interval $\Delta t$ in a predetermined time range (for example, from t=Ts to Te) is acquired using a predetermined time interval $\Delta t$. The end of the time range is a time after the part corresponding to the position X related to the calculation on the medium passes through the correction unit 5.

Here, when the time range (from t=0 to t=T) or the time interval dt of the deformation history is different from the calculation range or the time subtraction $\Delta t$ of the temporal variation in stress calculated herein, the deformation history information can be interpolated or extrapolated to acquire $\Delta s/\Delta t$. The points inside the medium shown in FIG. 7 should be set in the direction perpendicular to the medium transporting direction as well as in the thickness direction and should be considered two-dimensionally. However, it is considered that the correction unit 5 uniformly applies the deformation in the direction perpendicular to the medium transporting direction and thus the points are one-dimensionally considered. When the calculation is two-dimensionally performed, the one-dimensionally performed calculation has only to be repeated by the number of points set in the direction perpendicular to the medium transporting direction (when plural points are set in the medium transporting direction and the medium is modeled three-dimensionally, the calculation has only to be repeated by the number of points similarly). Accordingly, a one-dimensional calculation is assumed herein.

The calculation unit 32 calculates the predicted value of the internal residual stress using Expression (1) expressing the relationship between the stress and the distortion. In the expression, K represents the elastic modulus, $\mu$ represents the viscosity coefficient, and cry represents the yield stress. The viscosity coefficient $\mu$ can be expressed by Expression (4)

using an initial viscosity coefficient $\mu_0$, a distortion-dependent coefficient A, and a viscous element distortion $\epsilon_{vis}$. The elastic modulus K and the yield stress $\sigma_Y$ are information specific to a target medium and are determined in advance.

$$\text{If } -\sigma_Y \leq \sigma \leq \sigma_Y \text{ is satisfied, } \dot{\epsilon} = \frac{\dot{\sigma}}{K} \quad (1)$$

$$\text{Otherwise, } \dot{\epsilon} = \frac{\dot{\sigma}}{K} + \frac{\sigma - \sigma_Y(\epsilon)}{\mu} \text{ is used.}$$

$$\mu = \mu_0 + A \cdot \epsilon_{vis} \quad (4)$$

Expression (1) includes an elasticity term representing the elasticity and a term related to a plastic deformation. The elasticity term is expressed by Expression (5) and the term related to the plastic deformation is expressed by Expression (6)

$$\dot{\epsilon} = \frac{\dot{\sigma}}{K} \quad (5)$$

$$\frac{\sigma - \sigma_Y(\epsilon)}{\mu} \quad (6)$$

As shown in FIG. 7, the calculation unit 32 takes N points p1, p2, ..., pN in the thickness direction in a virtual cutting plane at a predetermined position (the center in the medium transporting direction or the like) in the medium transporting direction and expresses the stress at the points at time n by Expression (7).

$$\sigma_i^n (i=1,2,\ldots,N) \quad (7)$$

In FIG. 7, the distortion on the upper surface in the drawing in which the medium is stretched is defined as a stretching distortion ($\epsilon > 0$) and the distortion on the lower surface in the drawing in which the medium is shrunken is defined as a shrinking distortion ($\epsilon < 0$). A state where no distortion is present is a state of $\epsilon = 0$. When Expression (1) is changed to the form of a time subtraction (interval $\Delta t$) with respect to the stress, Expression (8) representing the forward difference of the stress at the points is obtained.

$$\text{If } -\sigma_Y \leq \sigma \leq \sigma_Y \text{ is satisfied, } \sigma_i^{n+1} = \sigma_i^n + K\Delta\epsilon \quad (8)$$

Otherwise, $$\sigma_i^{n+1} = \sigma_i^n \cdot \exp\left(-\frac{\Delta t}{\tau_i}\right) + \left(1 - \exp\left(-\frac{\Delta t}{\tau_i}\right)\right) \cdot \left(\mu_i \frac{\Delta\epsilon}{\Delta t} + \sigma_{Y_i}^n\right) \text{ is used.}$$

The calculation unit 32 in this exemplary embodiment calculates the predicted value of the internal residual stress of the medium passing through the correction unit 5 using Expression (8) based on Expression (1). Expression (8) includes Expression (9) expressing the elasticity term representing the elasticity and Expression (10) expressing the term related to the plastic deformation.

$$\sigma_i^n \cdot \exp\left(-\frac{\Delta t}{\tau_i}\right) \quad (9)$$

$$\left(1 - \exp\left(-\frac{\Delta t}{\tau_i}\right)\right) \cdot \left(\mu_i \frac{\Delta\epsilon}{\Delta t} + \sigma_{Y_i}^n\right) \quad (10)$$

Here, $\tau$ represents a time constant expressed by Expression (11). $\epsilon Y$ represents the yield limit distortion expressed by Expression (12).

$$\tau = \frac{\mu}{K} \quad (11)$$

$$\epsilon_Y = \frac{\sigma_Y}{K} \quad (12)$$

The calculation unit 32 substitutes the calculated temporal variation of distortion $\epsilon$, that is, $\Delta\epsilon/\Delta t$, for Expression (8), sequentially calculates the stress, and acquires the stress (the stress remaining inside because the medium passes through the correction unit 5 at this time) at time t=Te at the points shown in FIG. 7. That is, the calculation unit 32 acquires the values of the internal residual stress at time t=Te at the points when N points p1, p2, ..., pN in the thickness direction are taken at a point X in the medium transporting direction through the use of this calculation and outputs the acquired values as information representing the predicted values of the internal residual stress.

The correction amount calculating unit 33 calculates information of the correction amount for reducing the internal residual stress of the medium passing through the correction unit 5 using the information of the predicted values of the internal residual stress calculated by the calculation unit 32. Specifically, a stress at which the balancing moment with the predicted values of the internal residual stress at the points in the thickness direction is "0" is calculated (FIG. 8A). The correction amount calculating unit 33 creates and outputs information for controlling the correction amount such as the inter-shaft distance of the rollers of the correction unit 5 on the basis of the distribution of the calculated predicted values of the internal residual stress. Widely-known methods can be used to create the information for controlling the correction amount corresponding to the information on the stress distribution and thus will not be described in detail.

Figure 8B:
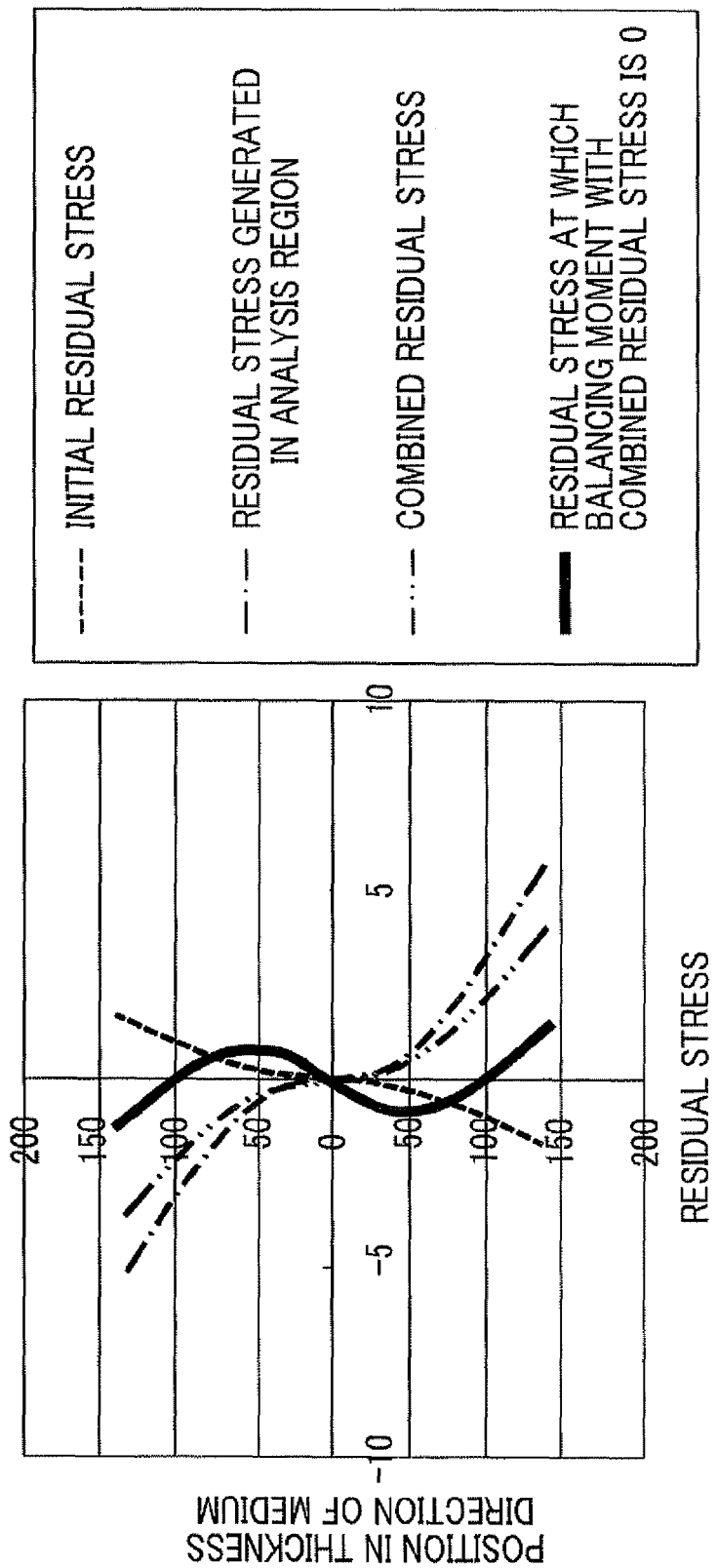

In this exemplary embodiment, a deformation may be present in advance in a medium (which is referred to as an initial deformation). In this case, the calculation unit 32 of the control unit 11 may calculate the internal stress (the initial internal stress) at the points shown in FIG. 7 on the basis of the initial deformation, may add the calculated values to the predicted values of the internal residual stress, calculated by the use of Expression (8), at the corresponding points to correct the predicted values of the internal residual stress, and may output the resultant values as new predicted values of the internal residual stress. In this case, the correction amount calculating unit 33 calculates the stress at which the balancing moment is "0" with respect to the corrected predicted values of the internal residual stress at the points in the thickness direction (FIG. 8B). The initial deformation is detected in advance by the use of a device (not shown) detecting a deformation, which is disposed in the transport unit 3. The control unit 11 receives the information of the deformation detected by the device and calculates the initial internal stress using the information.

Figure 9:
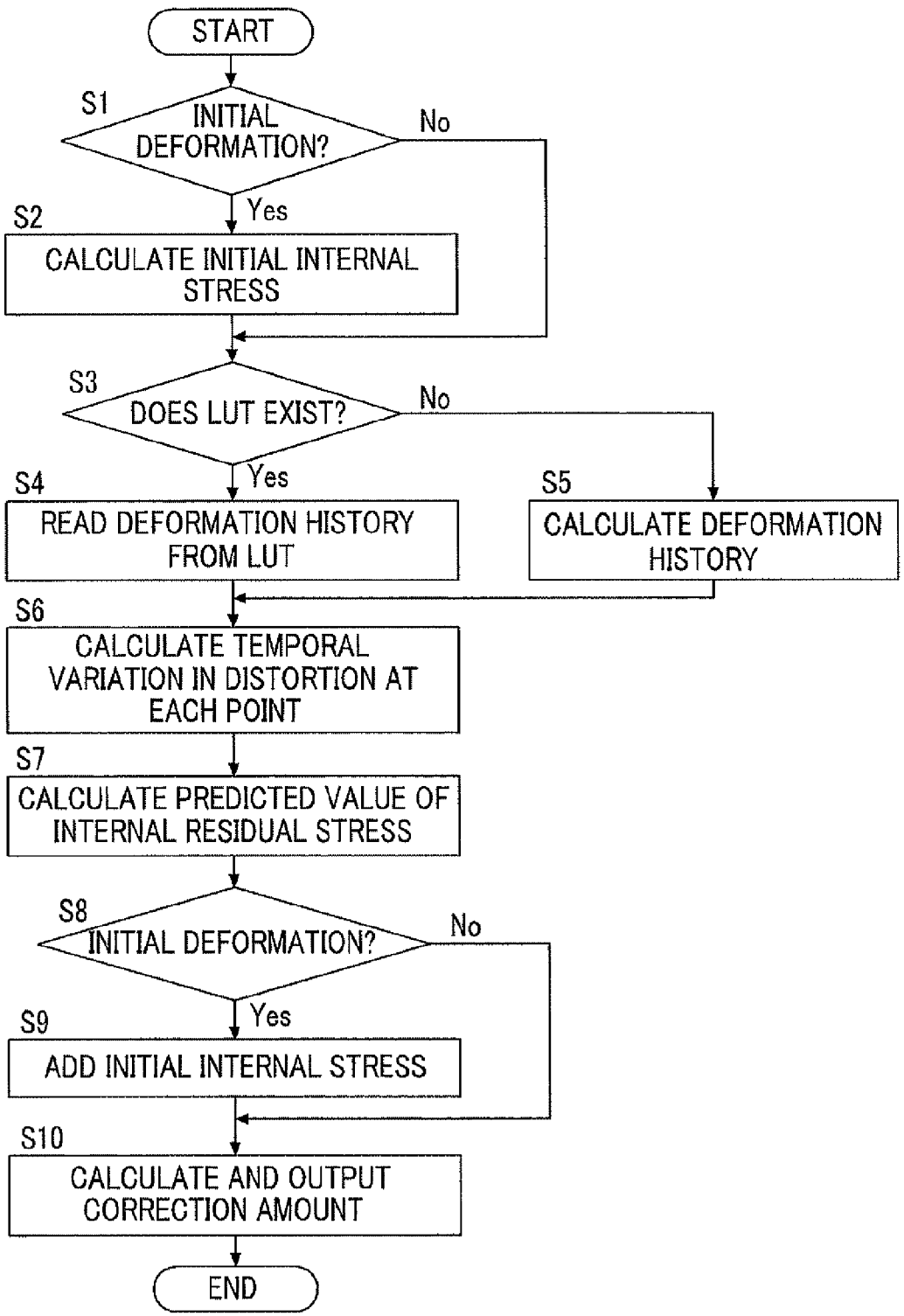
FIG. 9 is a flowchart illustrating the operation flow of the internal residual stress calculating device according to the exemplary embodiment of the invention.

The internal residual stress calculating device 1 according to this exemplary embodiment has the above-mentioned configuration and operates as described below. That is, as shown in FIG. 9, the internal residual stress calculating device 1 receives the information specifying the stiffness of a medium output from the apparatus control unit 6. Then, the internal residual stress calculating device 1 first determines whether the initial deformation is present (S1). It is determined that the initial deformation is present when the information of the deformation is input from the device detecting the initial deformation and the input deformation is not "0", and it is determined that the initial deformation is not present otherwise.

When it is determined in step S1 that the initial deformation is present (YES), the internal residual stress calculating device 1 calculates the value of the initial internal stress based on the initial deformation (S2). The internal residual stress calculating device 1 determines whether the LUT corresponding to the stiffness of the medium specified by the information output from the apparatus control unit 6 is stored (S3). When it is determined in step S1 that the initial deformation is not present (NO), the internal residual stress calculating device 1 performs the process of step S3.

When it is determined in step S3 that the LUT is stored (YES), the internal residual stress calculating device 1 reads the deformation values d0, d1, . . . , dn (the deformation history) at times t0, t1, t2, . . . , tn (where t0=0, ti−1<ti, ti+1−ti=dt, tn=T) obtained by dividing a period of time from a certain time t=0 before the correction in the correction unit 5 to a time t=T after the correction by a predetermined interval dt with reference to the stored LUT (S4).

When it is determined in step S3 that the LUT is not stored (NO), the internal residual stress calculating device calculates the deformation values d0, d1, . . . , dn (the deformation history) at times t0, t1, t2, . . . , tn (where t0=0, ti−1<ti, ti+1−ti=dt, tn=T) obtained by dividing a period of time from a certain time t=0 before the correction in the correction unit 5 to a time t=T after the correction by a predetermined interval dt by the use of a predetermined approximation formula or the like in consideration of a structural analysis method or the like (S5).

In this way, when the values of the temporal variation in deformation d0, d1, . . . , dn are calculated, the internal residual stress calculating device 1 calculates the temporal variation in distortion ϵ at the points, which are set in the thickness direction as shown in FIG. 7, inside the medium on the basis of the values of the temporal variation (S6).

The internal residual stress calculating device 1 calculates the predicted values of the internal residual stress using Expression (1) expressing the relationship between the stress and the distortion.

$$\text{If } -\sigma_Y \leq \sigma \leq \sigma_Y \text{ is satisfied, } \dot{\epsilon} = \frac{\dot{\sigma}}{K} \quad (1)$$

$$\text{Otherwise, } \dot{\epsilon} = \frac{\dot{\sigma}}{K} + \frac{\sigma - \sigma_Y(\epsilon)}{\mu} \text{ is used.}$$

Specifically, when Expression (1) is changed to the form of a time subtraction (interval Δt) with respect to the stress, Expression (8) representing the forward difference of the stress at the points is obtained.

$$\text{If } -\sigma_Y \leq \sigma \leq \sigma_Y \text{ is satisfied, } \sigma_i^{n+1} = \sigma_i^n + K\Delta\epsilon \quad (8)$$

Otherwise, $$\sigma_i^{n+1} = \sigma_i^n \cdot \exp\left(-\frac{\Delta t}{\tau_i}\right) + \left(1 - \exp\left(-\frac{\Delta t}{\tau_i}\right)\right) \cdot \left(\mu_i \frac{\Delta\epsilon}{\Delta t} + \sigma_{Y_i}^n\right) \text{ is used.}$$

The internal residual stress calculating device 1 substitutes the calculated temporal variation of the distortion ϵ, that is, Δϵ/Δt, for Expression (8) to sequentially calculate the stress and obtains the predicted values of the stress (the stress remaining inside because the medium passes through the correction unit 5 at this time) at time t=Te at the points shown in FIG. 7 (S7).

Then, the internal residual stress calculating device 1 determines whether the initial deformation is present (S8). This determination may be performed in the same way as in step S1.

When it is determined in step S8 that the initial deformation is present (YES), the internal residual stress calculating device 1 adds the values of the initial internal stress at the points based on the initial deformation calculated in step S2 to the predicted values of the internal residual stress at the corresponding points acquired in step S7 and sets the resultant values as new predicted values (S9). The internal residual stress calculating device 1 calculates the information of the correction amount with which the internal residual stress of the medium passing through the correction unit 5 is reduced using the information of the predicted values of the internal residual stress calculated in step S9 (S10).

When it is determined in step S8 that the initial deformation is not present (NO), the internal residual stress calculating device 1 performs the process of step S10, that is, calculates the information of the correction amount with which the internal residual stress of the medium passing through the correction unit 5 is reduced using the information of the internal residual stress calculated in step S7.

The internal residual stress calculating device 1 outputs the information of the correction amount to the correction unit 5. The correction unit 5 adjusts the correction amount on the basis of the input information of the correction amount and corrects the transported medium.

The expression used to calculate the internal residual stress used by the calculation unit 32 in this exemplary embodiment is not limited to Expression (8) obtained by changing Expression (1) into the form of subtraction, but may be an expression including a term related to a plastic deformation and an elasticity term, such as Expression (2) or Expression (3).

$$\text{If } -\sigma_Y \leq \sigma \leq \sigma_Y \text{ is satisfied, } \sigma_i^{n+1} = \sigma_i^n + K\Delta\epsilon \quad (2)$$
$$\text{Otherwise, } \sigma_i^{n+1} = K\Delta\epsilon + \sigma_{Y_i}^n(\epsilon, \dot{\epsilon}) \text{ is used.}$$

$$\text{If } -\sigma_Y \leq \sigma \leq \sigma_Y \text{ is satisfied, } \sigma_i^{n+1} = \sigma_i^n + K\Delta\epsilon \quad (3)$$
Otherwise, $$\sigma_i^{n+1} = \sigma_i^n + \left(K - \frac{\sigma_{Y_i}^n(\epsilon, \dot{\epsilon})}{\epsilon_{Y_i}^n(\epsilon, \dot{\epsilon})}\right)\Delta\epsilon$$

$$= \sigma_i^n + K'(\epsilon, \dot{\epsilon})\Delta\epsilon \text{ is used.}$$

Here, Expression (13) represents the yield stress at time n (a function based on the distortion and the temporal variation in distortion) and K' represents an equivalent elastic modulus in a plastically deformed state.

$$\sigma_{Y_I}^n \quad (13)$$

In this exemplary embodiment, the calculation unit 32 may use an expression set in advance, for example, depending on the type of a medium input from the apparatus control unit 6 out of Expressions (8), (2), and (3).

Specifically, Expression (2) is suitable for a medium such as a coated sheet of paper in which the plastic deformation can be easily caused and Expression (3) takes consideration of the internal residual stress in a medium having a high water content. Accordingly, the calculation unit 32 receives the information for specifying the type of a medium from the apparatus control unit 6, may perform the calculation using Expression (2) when the medium to be corrected is a medium such as a coated sheet of paper in which plastic deformation can be easily caused, may perform the calculation using Expression (3) when the medium to be corrected is a medium having a high water content, and may perform the calculation using Expression (8) (Expression (1)) otherwise.

According to this exemplary embodiment, it is possible to predict a deformation (a stress corresponding thereto) close to the measured value, as shown in FIG. 10, compared with the case where only the elasticity is considered. FIG. 10 shows the deformation corresponding to the stress calculated by the calculation unit 32 in this exemplary embodiment. Even when the curvature history is different, it can be seen that the calculation unit 32 of this exemplary embodiment calculates the stress corresponding to the values close to the measured values, compared with the case where only the elasticity is considered.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a prediction unit that predicts a temporal variation in deformation which is received by a medium having an image formed thereon from a correcting device correcting a deformation;
a calculation unit that calculates an internal residual stress of the medium having passed through the correcting device on the basis of a relational expression including an elasticity term and a term related to a plastic deformation, and the temporal variation in deformation predicted by the prediction unit, the elasticity term including a component corresponding to a distortion at predetermined points in the medium; and
a correction unit that corrects a position of the medium, by forcibly deforming the medium, based upon the calculation by the calculation unit, the forcibly deforming of the medium occurring by applying a pressing force to the medium.

2. The image forming apparatus according to claim 1, wherein the relational expression used in the calculation unit is selected depending on the type of the medium from expressions:

$$\text{If } -\sigma_Y \leq \sigma \leq \sigma_Y \text{ is satisfied, } \dot{\epsilon} = \frac{\dot{\sigma}}{K} \quad (1)$$
$$\text{Otherwise, } \dot{\epsilon} = \frac{\dot{\sigma}}{K} + \frac{\sigma - \sigma_Y(\epsilon)}{\mu} \text{ is used,}$$

$$\text{If } -\sigma_Y \leq \sigma \leq \sigma_Y \text{ is satisfied, } \sigma_i^{n+1} = \sigma_i^n + K\Delta\epsilon \quad (2)$$
$$\text{Otherwise, } \sigma_i^{n+1} = K\Delta\epsilon + \sigma_{Y_i}^n(\epsilon, \dot{\epsilon}) \text{ is used,}$$
and $$\text{If } -\sigma_Y \leq \sigma \leq \sigma_Y \text{ is satisfied, } \sigma_i^{n+1} = \sigma_i^n + K\Delta\epsilon \quad (3)$$
$$\text{Otherwise,}$$
$$\sigma_i^{n+1} = \sigma_i^n + \left(K - \frac{\sigma_{Y_i}^n(\epsilon, \dot{\epsilon})}{\epsilon_{Y_i}^n(\epsilon, \dot{\epsilon})}\right)\Delta\epsilon$$
$$= \sigma_i^n + K'(\epsilon, \dot{\epsilon})\Delta\epsilon \text{ is used,}$$

where K represents an elastic modulus, μ represents a viscosity coefficient, ε represents a distortion, $\sigma_Y$ represents a yield stress, and $\sigma_i^n$ represents a stress at point i at time n.

3. The image forming apparatus according to claim 1, further comprising:
a storage unit that stores information representing the temporal variation in deformation which is received by the medium from the correcting device in advance,
wherein the prediction unit predicts the temporal variation in deformation which is received by the medium from the correcting device on the basis of the information stored in the storage unit.

4. The image forming apparatus according to claim 2, further comprising:
a storage unit that stores information representing the temporal variation in deformation which is received by the medium from the correcting device in advance,
wherein the prediction unit predicts the temporal variation in deformation which is received by the medium from the correcting device on the basis of the information stored in the storage unit.

5. The image forming apparatus according to claim 2, wherein Expression 2 is selected when the medium is a coated sheet of paper.

6. The image forming apparatus according to claim 2, wherein Expression 3 is selected when the medium is a medium having a water content above a predetermined level.

7. A non-transitory computer-readable medium storing a program which causes a computer to serve as:
a prediction unit that predicts a temporal variation in deformation which is received by a medium having an image formed thereon from a correcting device correcting a deformation;
a calculation unit that calculates an internal residual stress of the medium having passed through the correcting device on the basis of a relational expression including an elasticity term and a term related to a plastic deformation and the temporal variation in deformation predicted by the prediction unit, the elasticity term including a component corresponding to a distortion at predetermined points in the medium; and
correction twit that corrects a position of the medium, by forcibly deforming the medium, based upon the calculation by the calculation unit, the forcibly deforming of the medium occurring by applying a pressing force to the medium.

8. A correction method comprising:
predicting, using a prediction unit, a temporal variation in deformation which is received by a medium having an image formed thereon from a correcting device correcting a deformation;
calculating, using a calculation unit, an internal residual stress of the medium having passed through the correcting device on the basis of a relational expression including an elasticity term and a term related to a plastic deformation and the temporal variation in deformation predicted by the prediction unit, the elasticity term including a component corresponding to a distortion at predetermined points in the medium; and correcting a position of the medium, by forcibly deforming the medium based upon the calculation by the calculation unit, the forcibly deforming of the medium occurring by applying a pressing force to the medium.

\* \* \* \* \*